United States Patent [19]

Taylor

[11] 4,109,369

[45] Aug. 29, 1978

[54] METHODS OF JOINTING OPTICAL FIBRES

[75] Inventor: John Edward Taylor, Cookham, England

[73] Assignee: BICC Limited, London, England

[21] Appl. No.: 551,341

[22] Filed: Feb. 20, 1975

[30] Foreign Application Priority Data

Feb. 21, 1974 [GB] United Kingdom ............... 7964/74

[51] Int. Cl.² .................... B23Q 3/00; G02B 5/14
[52] U.S. Cl. .................................. 29/467; 156/158; 350/96.21
[58] Field of Search ............. 29/467, 629, 630 A, 29/630 F; 156/49, 157, 158, 304, 502; 350/96 R, 96 C, 96.21

[56] References Cited

U.S. PATENT DOCUMENTS

| 2,733,181 | 1/1956 | Riedesel ........................ 156/159 |
| 3,487,871 | 1/1970 | Kanamori ...................... 156/304 |
| 3,768,146 | 10/1973 | Braun et al. ................... 350/96 |

OTHER PUBLICATIONS

C. Someda, "Simple, Low-Loss Joints Between Single-Mode Optical Fibers", 4/73, The Bell System Technical Journal, vol. 52, No. 4, pp. 583–596.

*Primary Examiner*—Douglas J. Drummond
*Assistant Examiner*—Michael W. Ball
*Attorney, Agent, or Firm*—Buell, Blenko & Ziesenheim

[57] ABSTRACT

In effecting a joint between two optical fibres an elongate gauge having a cross-sectional shape and size corresponding to that of each of the optical fibres to be jointed is laid on a substantially flat surface of a soft, substantially non-resilient metallic body, e.g. annealed copper, and is pressed into the surface to form in, and between two edges of, the surface a groove of a substantially complementary cross-sectional size. The gauge is removed and the two optical fibres are aligned in the groove so formed in such a way that neighboring end of the optical fibres substantially abut. A second body having a flat surface is applied to the grooved surface in such a way that its flat surface is in interfacial contact with the grooved surface, and the two bodies are secured together.

14 Claims, 4 Drawing Figures

METHODS OF JOINTING OPTICAL FIBRES

This invention relates to a method of effecting a joint between two optical fibres, one or each of which may be an element of an optical cable.

According to the invention the method comprises laying on a substantially flat surface of a body of metal or metal alloy that has been so treated that it is soft and substantially non-resilient an elongate gauge having a cross-sectional shape and size corresponding to that of each of the optical fibres to be jointed; pressing the gauge into said surface to form in, and between two edges of, the surface a groove of a substantially complementary cross-sectional size; removing the gauge and aligning the two optical fibres in the groove so formed in such a way that neighbouring ends of the optical fibres substantially abut; applying to said grooved surface a second body having a flat surface in such a way that the flat surface of said second body is in interfacial contact with the grooved surface; and securing the two bodies together.

By virtue of the fact that the metal or metal alloy is substantially non-resilient a groove formed in the flat surface of the body when the elongate gauge is pressed into the surface will not, in the course of time, so lose its shape that the groove is no longer suitable for reception of the optical fibres for which it is formed.

The body in which a groove is to be formed may be of copper or a copper-based alloy that has been annealed to such an extent that it is soft and substantially non-resilient; it is preferred to employ a body of copper that has been substantially fully annealed so that it has a Vickers hardness of approximately 50 Kgf/sq.mm. In some circumstances the body may be of aluminium or an aluminium-based alloy that has been hardened to such an extent that it is substantially non-resilient but is still sufficiently soft for a groove to be formed in it. The body may be of any other suitably soft, non-resilient metal or metal alloy, silver being one possibility.

The second body may be of a metal or metal alloy similar to that of the grooved body, it may be of glass or it may be made of a material that is sufficiently deformable, if compressed when the bodies are secured, to assist in retaining the optical fibres in the groove.

Each body is preferably in the form of a flat plate.

Preferably, before the optical fibres are placed in the groove or after the optical fibres have been placed in the groove but before their neighbouring ends are caused to abut, an index matching liquid or resin is applied to the groove at least in the region where the ends of the optical fibres are to be caused to abut, thereby to improve the light-coupling efficiency between the two fibres.

Where the optical fibres to be jointed are of substantially the same cross-sectional shape and size the elongate gauge employed to form the groove may comprise a length of optical fibre of substantially the same cross-sectional shape and size as the fibres to be jointed. Where one of the fibres to be jointed has a cross-sectional shape and/or size different from the cross-sectional shape and/or size of the other fibre, an elongate gauge is employed whose outer surface is stepped part way along its length, the shape and cross-sectional size of one part of the gauge corresponding to those of one of the fibres to be jointed and the cross-sectional shape and size of the other part of the gauge corresponding to those of the other fibre to be jointed. In the latter case preferably the second body is of a deformable material so that, when compressed, it will assist in retaining the optical fibre of smaller cross-sectional size in the groove.

The step of pressing the elongate gauge into the flat face of the body of soft, substantially non-resilient metal or metal alloy is preferably effected by placing the body with the gauge laid on its flat surface in a vice whose jaws have complementary flat surfaces and tightening the vice to press the gauge into the flat surface of the body, but any other convenient method may be employed.

The two bodies are preferably detachably secured together in order that the joint between the two optical fibres can be disconnected if desired. Suitable clamps can be used for this purpose.

It will be appreciated that more than one optical fibre joint may be effected in the same flat surface of the body at any one time or at different times.

The method of the invention is applicable both to optical fibres of a single transparent material, the refractive index of which may gradually decrease in a direction towards the outer surface of the fibre over at least a part of the distance between the central axis of the fibre and its outer surface, and to optical fibres of composite form comprising a core of transparent material clad throughout its length with another transparent material of lower refractive index which, by total internal reflection of light being transmitted along the fibre, confines at least a major porportion of the light within the core.

The invention also includes a joint between two optical fibres made by the method above described.

The invention is further illustrated by a description, by way of example, of the preferred method of effecting a joint between two optical fibres with reference to the accompanying drawing, in which.

Figure 1:
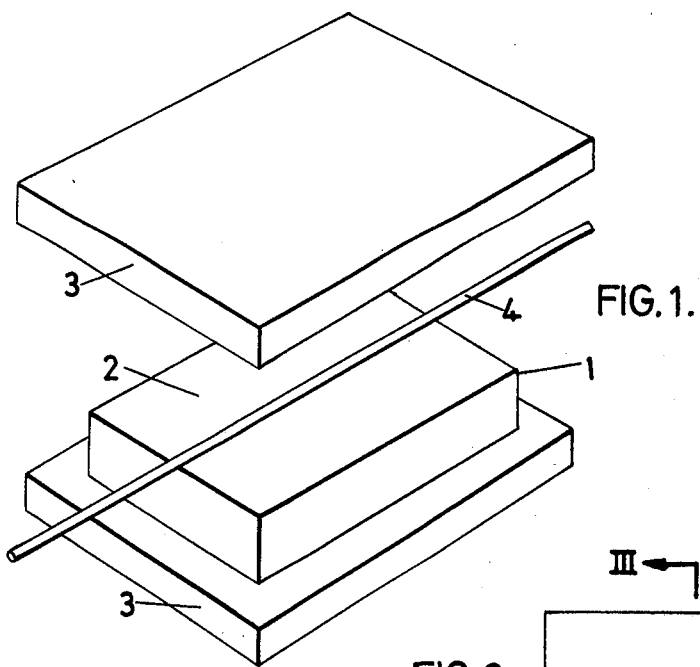
FIG. 1 is a diagrammatic perspective view of the step of forming a groove in a flat surface of a body of copper.

Referring to FIG. 1, a body 1 of fully annealed copper having a Vickers hardness of approximately 50 Kgf/sq.mm. is placed between the flat faced jaws 3 of a vice and a length 4 of optical fibre of substantially the same cross-sectional shape and size as the optical fibres to be jointed is laid on a flat surface 2 of the body 1 so that it protrudes beyond opposite end edges of the surface. The length 4 of optical fibre is pressed into the surface 2 by tightening the jaws 3 of the vice together thereby to form a groove 5 (FIG. 4) of a substantially complementry cross-sectional size. The body 1 is now removed from between the jaws 3 of the vice and the length 4 of optical fibre is removed from the groove 5.

Figure 2:
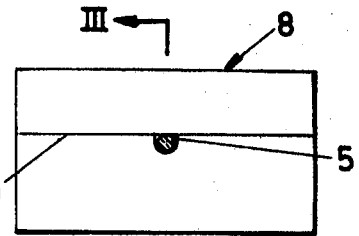
FIG. 2 is an end view of the joint between two optical fibres made by the method.
Figure 3:
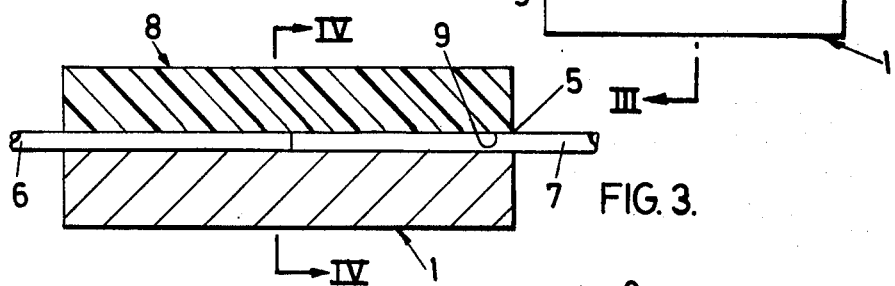
FIG. 3 is a sectional view taken on the line III — III in FIG. 2.
Figure 4:
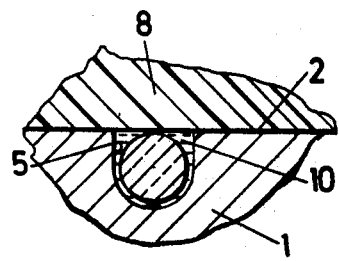
FIG. 4 is a fragmental sectional view taken on the line IV — IV in FIG. 3, drawn on an enlarged scale.

Referring to FIGS. 2 to 4, a drop 10 of liquid paraffin or other index matching liquid is applied to the groove 5 in the region of its mid point and the optical fibres 6 and 7 to be jointed are fitted into the groove so that their neighbouring ends, which have been so cut that their end faces each lies in a plane normal to the fibre axis, abut at approximately the mid point of the groove, the index matching liquid thereby serving to improve the light-coupling efficiency between the two fibres. A second body 8 of perspex having a flat surface 9 is now applied to the body 1 so that the flat surfaces 2 and 9 are in interfacial contact and the two bodies are clamped together by clamps (not shown).

A joint between two optical fibres, each of composite form consisting of a core and cladding and each of overall diameter 125μ, made by the method as described with reference to the drawing, had an attenuation less than 0.5dB, i.e. more than 90% transmission.

In some cases the body 8 may be of glass or may be of a material which, as the jaws 3 are clamped together, is deformed to such an extent that it flows into parts of the groove 5 not occupied by the optical fibres, thereby helping to maintain the optical fibres in the groove.

What I claim as my invention is:

1. A method of effecting a joint between two optical fibres which comprises laying on a substantially flat surface of a metallic body that is soft and substantially non-resilient an elongate gauge having a cross-sectional shape and size corresponding to that of each of the optical fibres to be jointed; pressing the gauge into said surface to form in, and between two edges of, the surface a groove of a substantially complementary cross-sectional size; removing the gauge and aligning the two optical fibres in the groove so that neighboring ends of the optical fibres substantially abut; applying to said grooved surface a second body having a flat surface so that the flat surface of said second body is in interfacial contact with the grooved surface; and securing the two bodies together.

2. A method as claimed in claim 1, wherein the two bodies are detachably secured together.

3. A method as claimed in claim 2, wherein the two bodies are clamped together.

4. A method as claimed in claim 3, wherein the second body is of a material which is sufficiently deformable that, when the bodies are clamped together, it is caused to flow into parts of the groove not occupied by the optical fibres.

5. A method as claimed in claim 1, wherein the second body is of a soft metallic material that has been so treated that it is soft and substantially non-resilient.

6. A method as claimed in claim 1, wherein the second body is of glass.

7. A method as claimed in claim 1, wherein each body is in the form of a flat plate.

8. A method as claimed in claim 1, wherein before the neighbouring ends of the optical fibres are caused to abut, an index matching liquid is applied to the groove at least in the region where the ends of the optical fibres are to be caused to abut.

9. A method as claimed in claim 1, in which the optical fibres to be jointed are of substantially the same cross-sectional shape and size, wherein the elongate gauge is a length of optical fibre.

10. A method as claimed in claim 1, in which one of the optical fibres to be jointed has a cross-sectional size different from the cross-sectional size of the other fibre, wherein the outer surface of the elongate gauge is stepped part way along the length of the gauge, the shape and cross-sectional size of one part of the gauge corresponding to those of one of the fibres to be jointed and the cross-sectional shape and size of the other part of the gauge corresponding to those of the other fibre to be jointed.

11. A method as claimed in claim 1, wherein the step of pressing the elongate gauge into the flat surface of the metallic body is effected by placing the body with the gauge laid on its flat surface in a vice whose jaws have complementary flat surfaces and tightening the vice to press the gauge into the flat surface of the body.

12. A method of effecting joints between at least two pairs of optical fibres, wherein the joints between said pairs of optical fibres are simultaneously effected in the same flat surface of a metallic body by the method claimed in claim 1.

13. A method of effecting a joint between two optical fibres which comprises laying on a substantially flat surface of a body of copper or a copper-based alloy that has been annealed to such an extent that it is soft and substantially non-resilient an elongate gauge having a cross-sectional shape and size corresponding to that of each of the optical fibres to be jointed, pressing the gauge into said surface to form in, and between two edges there of, the surface a groove of a substantially complementary cross-sectional size to that of the fibres; removing the gauge and aligning the two optical fibres in the groove so that neighboring ends of the optical fibres substantially abut; applying to said grooved surface a second body having a flat surface so that the flat surface of said second body is in interfacial contact with the grooved surface; and securing the two bodies together.

14. A method as claimed in claim 13, wherein the body in which the groove is formed is of copper that has been substantially fully annealed and has a Vickers hardness of approximately 50 Kgf/sq.mm.

* * * * *